Aug. 11, 1970 YASUO SUZUKI ET AL 3,524,091

SMALL MULTIPOLAR HYSTERESIS SYNCHRONOUS MOTOR

Filed May 17, 1967 2 Sheets-Sheet 1

INVENTORS
YASUO SUZUKI
YASUYOSHI KAMEYAMA by: Wolfe, Hubbard, Voit & Osann
ATTYS.

Aug. 11, 1970   YASUO SUZUKI ET AL   3,524,091
SMALL MULTIPOLAR HYSTERESIS SYNCHRONOUS MOTOR
Filed May 17, 1967   2 Sheets-Sheet 2
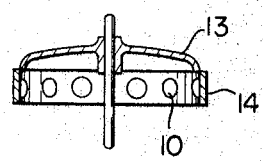
Fig. 9A
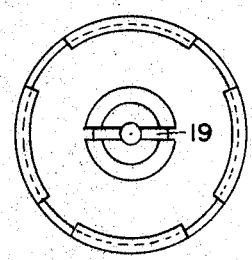
Fig. 10A
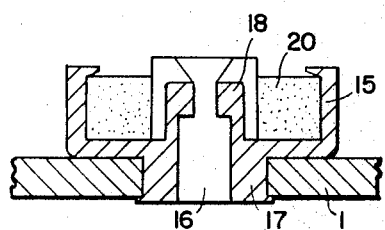
Fig. 10B
Fig. 9B
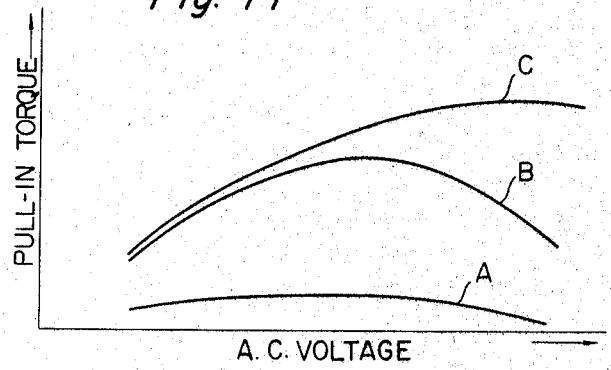
Fig. 11
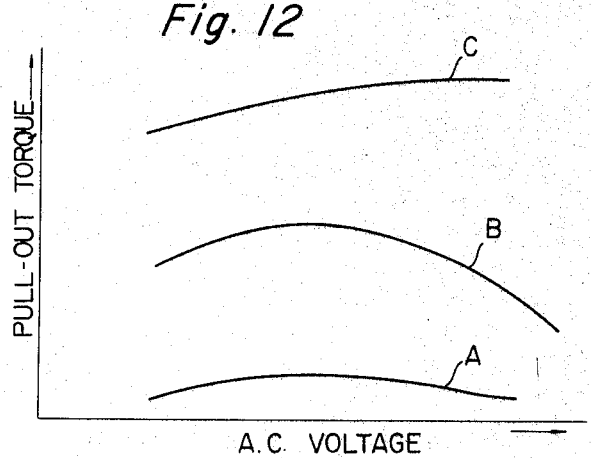
Fig. 12
INVENTORS
YASUO SUZUKI
YASUYOSHI KAMEYAMA
by Wolfe, Hubbard, Voit & Osann
ATTYS.

United States Patent Office 3,524,091
Patented Aug. 11, 1970

3,524,091
SMALL MULTIPOLAR HYSTERESIS
SYNCHRONOUS MOTOR
Yasuo Suzuki and Yasuyoshi Kameyama, Osaka, Japan, assignors to Matsushita Electric Works, Ltd., Osaka, Japan, a corporation of Japan
Filed May 17, 1967, Ser. No. 639,182
Claims priority, application Japan, May 18, 1966, 41/31,899
Int. Cl. H02k 19/06
U.S. Cl. 310—162
6 Claims

ABSTRACT OF THE DISCLOSURE

This invention relates to a small multipolar hysteresis motor wherein a rotor formed of disk-shaped hysteresis members or a drum-shaped hysteresis member each provided with as many through holes as the poles of the motor is rotatably borne in a rotary magnetic field so that the rotation at a synchronous velocity may be improved and a high output may be obtained.

---

This invention relates to improvements in small multipolar hysteresis type synchronous motors.

A conventional rotor used in a synchronous motor utilizing a shaded magnetic pole type rotary magnetic field is of such structure wherein a permanent magnet such as of barium ferrite made by alternately magnetically depositing as many N and S poles as the poles of the motor on the outer periphery of a cylindrical body is provided around a shaft or wherein a shaft is passed through the centers of two disks and hysteresis rings having no through hole are made by arranging said disks through a desired small clearance.

In case a rotor of the former structure is used in a shaded magnetic pole type rotary magnetic field, as N poles and S poles are alternately fixed to the rotor itself, due to the relations between the positions of the N poles and S poles and the positions of the magnetic pole teeth of the stator when the rotor stops, it will be very difficult to self-start the rotor only in one fixed direction. Further, there is a drawback that, even if the rotor rotates in either direction, due to the variation of the magnetic force of the rotary magnetic field by the variation of the primary winding voltage of the magnetic poles of the stator, the rotor torque will become uneven (that is, the cogging will be very high). However, this structure has advantages that the rotor will rotate at a synchronous velocity the moment it is switched and that the rotary torque is high. These advantages are caused by the facts that the permanent magnetic elements forming the rotor are so strongly magnetized in advance that the rotor rotates at the synchronous velocity of the rotary magnetic field.

In case a rotor of the latter structure is used in a shaded magnetic pole type rotary magnetic field, the rotor will self-start positively in one direction and will rotate smoothly but, when the rotary torque is low and the load is rather large, the rotary magnetic field will slide in the hysteresis ring and the rotor will not reach the synchronous velocity but will rotate in disorder. Such rotation in disorder is caused by the fact that the retentivity is very weak.

The present invention is suggested to eliminate the above mentioned drawbacks.

A principal obect of the present invention is to provide a hysteresis type synchronous motor which has a high rotary torque, rotates positively at a synchronous volocity, self-starts positively in the same direction and has no rotation in disorder.

Another object of the present invention is to provide a hysteresis type synchronous motor which is simple in the structure of the rotor and is easy to make.

A further object of the present invention is to provide a hysteresis type synchronous motor in which no cogging phenomenon will occur, therefore the life is long and noises are less.

The present invention shall be explained with reference to the drawings.

FIG. 9 shows another embodiment of a rotor of the present invention, (A) being a perspective view and (B) being a vertically sectioned view.

FIG. 10 shows a bearing to be used for the hysteresis motor of the present invention, (A) being a plan view and (B) being a vertically sectioned view.

FIGS. 11 and 12 show comparative diagrams of the characteristics of a motor of the present invention and a conventional motor.

Figure 1:
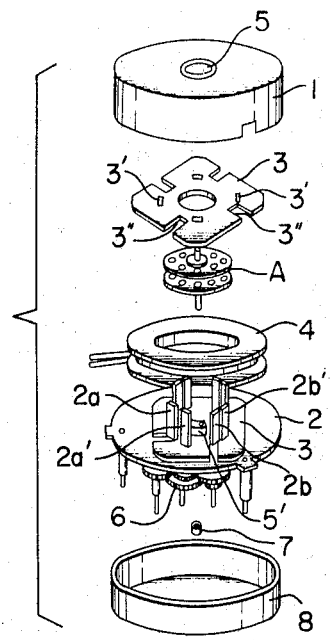
FIG. 1 is a disassembled prespective view of a hysteresis motor according to the present invention.
Figure 2:
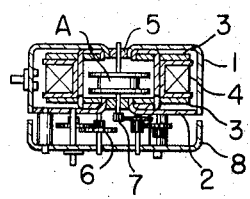
FIG. 2 is a sectioned side view of the same.

In FIGS. 1 and 2, 1 and 2 are stator iron cores made of a magnetic material and combined with each other to form an outer magnetic shell.

2a, 2a', 2b, 2b' . . . are stator magnetic pole teeth erected as directed upward or in the axial direction of the rotor on the upper surface of the above mentioned stator core and arranged on the same periphery as a plurality of magnetic pole teeth each consisting of a pair of two (2a, 2a'), (2b, 2b'), . . . . Further, the magnetic pole teeth (not illustrated) of the upper stator magnetic core 1 and the magnetic pole teeth of the lower stator magnetic core 2 are arranged on the same periphery so that the respective upper and lower pairs may be alternate with each other.

3 is a shading plate made of an electric conductor and provided with holes for fitting the stator pole teeth 2a', 2b' and with grooves 3" for containing the pole teeth 2a, 2b. When the above mentioned stator magnetic pole teeth are covered with the shading plate 3, shaded poles 2a', 2b' and nonshaded poles 2a, 2b will be formed so that a multipolar rotary magnetic field may be formed.

4 is an exciting coil formed by winding an insulated electric wire on a spool. When said exciting coil 4 is arranged outside the above mentioned magnetic pole tooth group and an alternating current is made to flow through the coil, the magnetic pole teeth will be excited and a multipolar rotary magnetic field will be formed.

A is a rotor rotatably borne with bearings 5 and 5'.

6 is a reduction gear train to reduce the rotating velocity of the rotor and transmit it to an output shaft. 7 is a pinion fixed to the rotor shaft so as to connect the rotor and the reduction gear train with each other. 8 is a case cover for the reduction gear mechanism.

Figure 3:
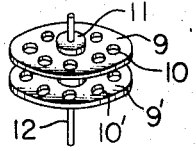
FIG. 3 and 4 are perspective views showing different embodiments of a rotor.

FIG. 3 is a perspective view of the rotor. 9 and 9' are disk-shaped hysteresis rings made of such hardened special magnetic steel as a tungsten carbon steel and having as many through holes 10 and 10', respectively, as the poles of the motor made at regular intervals on the same peripheries on their peripheral edges. Said hysteresis rings 9 and 9' are mounted as separated from each other on a shaft 12 through a nonmagnetic material 11.

Figure 4:
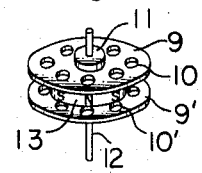

FIG. 4 shows a strong torque type rotor wherein a permanent magnet 13 having as many N poles and S poles as the magnetic poles of the stator magnetically deposited alternately at regular intervals on the outer periphery is fitted between the two hysteresis rings in the rotor in FIG. 3 so that the magnetic poles in the permanent magnet may coincide with the respective through holes 10 and 10′ in the hysteresis rings 9 and 9′.

Figure 5:
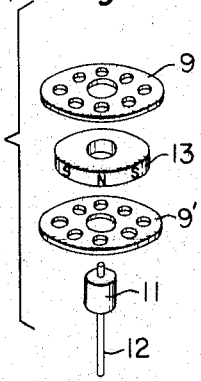
FIG. 5 is a disassembled perspective view of the rotor in FIG. 4.

FIG. 5 shows its formation as disassembled.

Figure 6:
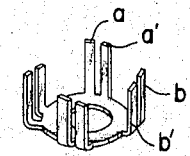
FIG. 6 is a perspective view of magnetic pole teeth of a stator.

FIG. 6 shows stator pole teeth made by being punched out of a magnetic iron plate and then being bent and to be fixed to each of the upper and lower stator cores 1 and 2.

Figure 7:
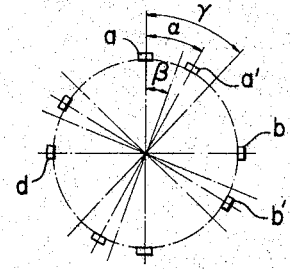
FIG. 7 is a view showing an arrangement of the magnetic pole teeth in FIG. 6.
Figure 8:
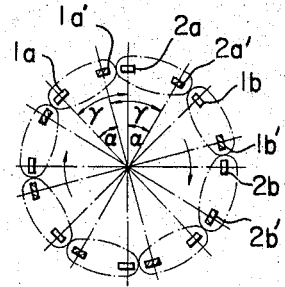
FIG. 8 shows an arrangement of the magnetic pole teeth of the stator.

FIG. 7 shows an arrangement of the magnetic pole teeth in FIG. 6. The teeth are so arranged, as shown in FIG. 6, to form a plurality of tooth pairs, and when the number of poles of the motor is P, the stator magnetic pole tooth group on one side will be formed of $P/2$ pairs or a total of P pairs counting both sides. If the angle between the two paired magnetic pole teeth represented by $(a-a')$, $(b-b')$ . . . is $\alpha$, they will be arranged so that $\beta < \alpha < \gamma$ wherein $\beta = 360°/2P$ and $\gamma = 360°/P$ FIG. 8 shows an arrangement of the stator magnetic pole teeth when the upper and lower stator cores are combined together. $(1a, 1a')$, $(1b, 1b')$ . . . are fixed to the stator core 1 and $(2a, 2a')$, $(2b, 2b')$ . . . are fixed to the stator core 2. $1a'$, $1b'$ . . . are fitted and inserted in the holes 3′ in the shading plate 3 so as to be magnetic poles delayed in the phase with respect to $1a$, $1b$ . . . by the shading effect. In the same manner, $2a'$, $2b'$ . . . are fitted and inserted in the holes 3′ in the shading plate 3 so as to be magnetic poles delayed in the phase with respect to $2a$, $2b$, . . . . The arrangement of such shaded poles and nonshaded poles is as follows. The angle $(1a-2a)$ between the two adjacent nonshaded poles $1a$ and $2a$ in $\gamma$ and the angle between the two adjacent shaded poles $1a'$ and $2a'$ is also $\gamma$. This relation is exactly the same in the following. Thus all the angles $(2a-1b)$, $(1b-2b)$ . . . $(2a'-1b')$, $(1b'-2b')$ . . . are $\gamma$. Further, the angles $(1a-1a')$, $(2a-2a')$, $(1b-1b')$, $(2b-2b')$ . . . between the nonshaded pole and shaded pole of the respective pairs are $\alpha$. When the magnetic pole tooth group arranged as in the above is alternately excited by the exciting coil 4, a clockwise rotary magnetic field will be generated (as indicated by the arrow in the drawing).

By arranging the stator magnetic pole teeth so that the angle between the shaded pole and the nonshaded pole paired in the stator magnetic pole tooth group may be $\alpha$ in $180°/P = \beta < \alpha < \gamma = 360°/P$, the performance of the motor is improved. That is to say, as the area of the shading plate surrounding the shaded magnetic pole teeth can be made larger than in the case that the poles are equally divided $(360°/2P)$, the phase lag by the shading plate can be increased. At the same time, by displacing the shaded poles in the direction of the rotary magnetic field with respect to the nonshaded poles, the action of the rotary magnetic field on the rotor can be made stronger and more effective. Thus, together with the fact that the total number of the magnetic pole teeth is 2P, the increase of the torque and the stability of the rotation can be established. It is desirable that the width of the magnetic pole tooth is properly large in the range of satisfying the above mentioned angular relations and not magnetically short-circuiting the teeth with each other.

The rotor is made of a hysteresis material of a residual magnetic induction Br of 8 to 10 kilo-gausses and coercive force Hc of 40 to 60 oersteds obtained by hardening such special magnetic steel as a tungsten carbon steel, is made in the form of a disk in the present invention and is provided with as many or P through holes as the poles at regular intervals on the peripheral edge. Such hysteresis material as a hardened tungsten carbon steel is comparatively so high in the reversible magnetic permeability that, the case of a multipolar and small rotor, the pole interval can not be made large enough and the permeance between the magnetic poles is comparatively large due to the material and shape. Therefore, when the rotor made of such hysteresis material is arranged in the rotary magnetic field of a stator, the magnetic poles induced in the rotor will be so likely to slide and move in the rotor that it will be difficult to maintain the synchronous velocity even with the slightest load.

According to the present invention, by providing as many or P through holes as the poles of the motor on the peripheral edge of a rotor made of such hysteresis material, P partition walls for the magnetic poles are made in the hysteresis material and as many magnetic poles as the magnetic poles of the stator are formed each by connecting the part of a low permeance and the part of a high permeance so that the magnetic poles induced in the rotor may be prevented from easily sliding in the hysteresis material due to the rotary magnetic fields of the stator.

Further, there is considered another example of a rotor wherein a permanent magnet having as many P magnetic N and S poles as the poles of the motor magnetically deposited alternately at regular intervals on the outer periphery in advance is brought into close contact with said hysteresis rings so that the poles may coincide with the through holes in the rings. A stronger synchronous rotary torque is guaranteeed to a rotor made of the hysteresis members provided with through holes. That is to say, a permanent magnet member much lower in the reversible magnetic permeability than a hardened tungsten carbon steel is combined in the formation of the rotor so that its magnetic force may act on the rotary magnetic field through the hysteresis members and the induced magnetic poles in the hysteresis member may not easily slide and move in the rings and may continue to rotate as synchronized with the rotary magnetic field of the stator even if the load is increased.

Generally, in a hysteresis type motor, when a rotor having fixed magnetic poles is arranged, it will be difficult to start the rotor, because it is desirable from the principle of starting the hysteresis type motor that the magnetic poles induced in the rotor should move to some extent. In the above mentioned rotor, too, it is possible for the permanent magnet to discharge most of the magnetic poles into either of the right and left through holes made in the hysteresis rings. But, if the magnetic poles of the permanent magnet are not made to coincide with the through holes in the hysteresis rings or, for example, are arranged intermediately between the through holes, said poles will be perfectly fixed in such positions and therefore the startability of the rotor will be very low.

Therefore, in the formation of such rotor, ideally the permanent magnet is inserted for the purpose of making magnetic poles having the moving degree controlled to some extent in the hysteresis rings. It is not good for the startability of the rotor that the magnetic poles of the permanent magnet greatly act directly on the magnetic poles of the stator. Therefore, the influence of the magnetic poles of the permanent magnet on the rotary magnetic field is made smaller than the influence of the hysteresis rings. That is to say, it is necessary that the diameter of the permanent magnet should be smaller than the diameter of the hysteresis ring and that its thickness should be properly small.

Further, when the diameter of the permanent magnet is made smaller, the characteristics of a hysteresis motor will be approached and the self-startability will be high but the torque will be smaller.

Thus the present invention is characterized by bringing a hysteresis ring or disk into close contact with a permanent magnet so that they may influence each other to reduce the effect of the permanent magnet and making the diameter of the permanent magnet smaller than the diameter of the hysteresis disk or ring so as to reduce the effect of the permanent magnet. Thereby the synchronous motor can be self-started always in the same direction and can be rotated smoothly by reducing cogging.

FIG. 9 shows another embodiment of the rotor. 14 is a drum-shaped hysteresis member. A disk 13 made of aluminum is secured to a shaft 12. Said drum-shaped hysteresis member 14 is secured to the outer peripheral part of said disk 13. 10 is a through hole made at regular intervals on the peripheral surface of said drum-shaped hysteresis member.

FIG. 10 shows a bearing to be used for the hysteresis motor of the present invention. 15 is a pot-shaped bearing body having a hole 16 to fit a shaft (not illustrated) in the center and fixed to the stator core 1 in the projecting part 17 in the bottom of the body. 18 is a cylindrical center wall provided around the through hole 16 and provided with a slit 19 in the diametral direction. 20 is such member impregnated with oil as felt and is fitted between the peripheral wall and center wall of the bearing body 15. In such construction, oil will naturally reach the shaft through the slit 19 and therefore the frictional resistance of the shaft can be reduced and the life of the motor can be elongated.

FIGS. 11 and 12 show comparisons of the characters of the hysteresis motor of the present invention and a conventional hysteresis motor. In FIG. 11, pull-in torques for the rotor are taken on the ordinate and alternating current voltages are taken on the abscissa. The curve A shows the case of using the conventional rotor. The curve B shows the case of using the rotor shown in FIG. 3. The curve C shows the case of using the rotor shown in FIG. 4.

FIG. 12 shows synchronous pull-out torques. The curves A, B and C are respectively of the same cases as in FIG. 11.

As in the above, according to the present invention, the slide of the magnetic poles in the hysteresis member of the hysteresis type motor in which the pole interval is small is controlled, therefore the rotation at a synchronous velocity can be greatly improved and a high output can be obtained. Due also to the stator construction of such magnetic pole tooth arrangement as is mentioned above, a small simple multipolar hysteresis motor easy to make can be provided by the present invention.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A small multipolar hysteresis type synchronous motor comprising the combination of means forming a plurality of motor poles, coil means operatively associated with said poles for producing a shaded rotary magnetic field, and a rotor operatively associated with said poles and coil means and including at least one member made of a hysteresis material and forming a number of through holes equal to the number of motor poles, said holes being arranged in a circular series around said hysteresis member, and said pole means including upper and lower stator cores each punched out of a magnet iron plate so as to have as many magnetic pole teeth as P poles of the motor, said magnetic pole teeth being bent so as to be arranged on the same periphery with the angle between the centers of successive pairs of said pole teeth being larger than $360°/2P$ but smaller than $360°/P$, one magnetic pole tooth of each pair being fitted and inserted in a shading plate so as to form a shaded pole with the other magnetic pole tooth of each pair forming a nonshaded pole, each pair of magnetic pole teeth of each stator core fitting between two successive pairs of pole teeth on the other stator core so that the respective upper and lower pairs of magnetic pole teeth are arranged on the same periphery, the angle between the centers of adjacent nonshaded poles of the upper and lower stators being $360°/P$, the angle between the centers of adjacent shaded poles of the upper and lower stators also being $360°/P$.

2. The hysteresis motor according to claim 1 wherein said rotor includes a drum-shaped hysteresis member forming said holes.

3. The hysteresis motor according to claim 1 wherein said rotor includes at least one disk-shaped hysteresis member forming said holes.

4. A small multipolar hysteresis type synchronous motor comprising the combination of means forming a plurality of motor poles, coil means operatively associated with said poles for producing a shaded rotary magnetic field, and a rotor operatively associated with said poles and coil means including a pair of discs each made of a hystersis material and each forming as many through holes as the poles of the motor, and a disc-shaped permanent magnet slightly smaller in the outer diameter than said hysteresis discs and having as many N and S magnetic poles as the poles of the motor and formed alternately on the outer periphery of said magnet with substantially the same spacing as said through holes.

5. The hysteresis motor according to claim 4 wherein said holes are uniformly spaced around said hysteresis member.

6. The hysteresis motor according to claim 4 having a bearing in which a slit is made in a center wall supporting a shaft and a member impregnated with oil is arranged on the outer periphery of said slit.

References Cited

UNITED STATES PATENTS

| | | | |
|---|---|---|---|
| 2,951,957 | 9/1960 | Eigeman | 310—164 |
| 2,981,855 | 4/1961 | Van Lieshout | 310—162 X |
| 3,059,131 | 10/1962 | Everard | 310—164 |
| 3,234,418 | 2/1966 | Tomaro | 310—164 |
| 2,474,797 | 6/1949 | Warren | 310—163 |

ORIS L. RADER, Primary Examiner

T. LANGER, Assistant Examiner